Sept. 10, 1963   J. D. GRIFFIN   3,103,488
PROCESS AND APPARATUS FOR THE TREATMENT
OF ORGANICALLY POLLUTED WASTE
Filed Aug. 14, 1961

INVENTOR
Joseph D. Griffin
BY
Kemon, Palmer, Stewart & Estabrook
ATTORNEY

United States Patent Office 3,103,488
Patented Sept. 10, 1963

3,103,488
PROCESS AND APPARATUS FOR THE TREATMENT OF ORGANICALLY POLLUTED WASTE
Joseph D. Griffin, Salisbury, Southern Rhodesia, assignor to Hazel Eleanor Griffin and Sylvia Constance Griffin, both of Monte Carlo, Monaco
Filed Aug. 14, 1961, Ser. No. 131,442
Claims priority, application Great Britain Aug. 15, 1960
6 Claims. (Cl. 210—6)

The present invention relates to the treatment of organically polluted waste by means of activated sludge and provides a method and apparatus for this purpose which are efficient and economical in power consumption.

According to the invention there is provided a process for the treatment of organically polluted waste comprising the steps of forming within a treatment tank a body of sludge charged with bacteria together with a superposed zone of clarified liquid, introducing the waste into the body of sludge through an inlet above the bottom of the body of sludge so that the solid constituents of the waste are retained therein and the liquid constituents flow upwardly therethrough into the zone of clarified liquid, removing liquid from the said zone at a level remote from the body of sludge, removing thickened sludge from the bottom of the body of sludge, reactivating the thickened sludge removed by aeration and returning a portion to the body of sludge from which it was removed, whereby a continuous circulation of sludge is obtained, the direction of flow of the circulating sludge within the treatment tank being downward.

There is also provided according to the invention an apparatus for the treatment of organically polluted waste comprising a treatment tank having an outlet for clarified liquid near its top, an outlet for thickened sludge near its base, an inlet for aerated sludge above the outlet for thickened sludge and remote from the outlet for clarified liquid, and an inlet for waste between the level of the outlet for thickened sludge and the level of the inlet for aerated sludge, and also comprising an aeration tank to which the outlet for thickened sludge and the inlet for aerated sludge are connected for the aeration of the thickened sludge and return of a portion to the treatment tank.

Figure 1:
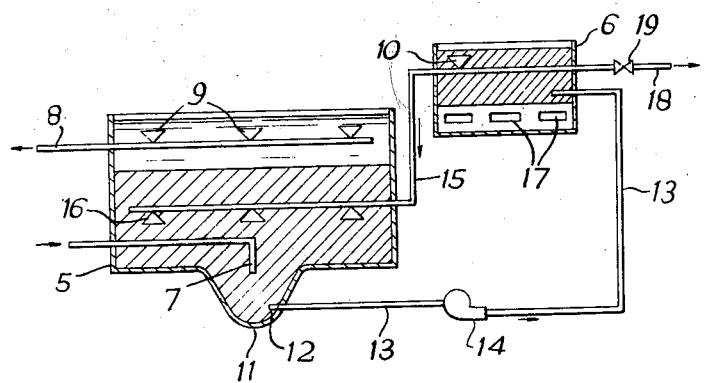
Figure 2:
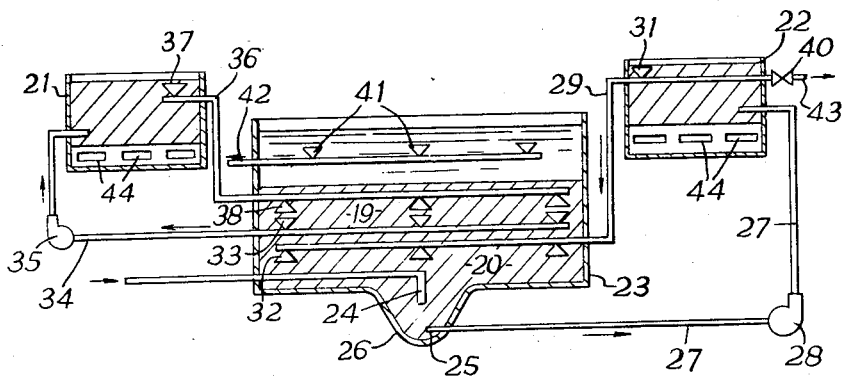

Two embodiments of the invention will now be described by way of example with reference to the accompanying drawings in which:

FIG. 1 is a diagrammatic representation of a vertical section through an apparatus for treating organically polluted waste, and FIG. 2 is a similar view of a further apparatus for treating organically polluted waste.

The apparatus shown in FIG. 1 comprises a treatment tank 5 and an aeration tank 6. The treatment tank 5 is provided with a waste inlet 7 in its bottom region and with an outlet pipe 8 for clarified liquid near its top. The clarified liquid flows into the outlet pipe 8 through cones 9. At the bottom of the treatment tank 5, in a sunk portion 11 of the base of the tank is an outlet 12 for thickened sludge. The outlet 12 is connected by a pipe 13 to the bottom part of the aeration tank 6 and a pump 14 is provided to pump thickened sludge from the treatment tank to the aeration tank.

A pipe 15 having an inlet cone 10 leads from the top of the aeration tank to inlet cones 16 for aerated sludge in the treatment tank, the cones 16 being located in the middle region of the tank.

In operation, waste is passed into the treatment tank 5 through the waste inlet 7. If necessary a pump may be provided for this purpose. The waste forms within the treatment tank a body of sludge charged with bacteria and a zone of clarified liquid above the sludge.

Further incoming waste passes into the body of sludge and the liquid constituents in the waste rise through the body thereby undergoing filtration and purification. The liquid eventually crosses the interface between the body of sludge and the zone of clarified liquid, and clarified liquid is discharged at the top of the treatment tank.

The solids in the incoming waste mix with the sludge in the treatment tank and are retained in the body of sludge. Thickened sludge is removed from the bottom of the treatment tank 5 and is pumped into the aeration tank 6 by the pump 14. The tank 6 contains a body of sludge undergoing aeration whilst flowing across the tank. Aeration is carried out by means of aerators 17.

The level of matter in the aeration tank 6 is maintained above the level in the treatment tank 5. In this embodiment the thickened sludge moves upwardly and across the aeration tank 6 and aerated sludge flows under gravity from the top of the aeration tank to the inlet cones 16 for aerated sludge in the treatment tank 5. The aerated sludge then flows downward through the treatment tank to the outlet 12. The flow rates of sludge and incoming waste are so adjusted that the inlet cones 16 are a short distance below the interface between the body of sludge and clarified liquid and the outlet cones 9 for clarified liquid are remote from the interface.

A discharge pipe 18 with a valve 19 is connected to the pipe 15 carrying aerated sludge from the aeration tank to the treatment tank to enable excess sludge to be removed from the aeration tank.

In the process described above, only thickened sludge is aerated and therefore the volume of matter undergoing aeration is less than in processes in which, for example, a mixture of waste and sludge is aerated. Consequently the size of the aeration plant required for the present process is smaller than that required for such purposes.

In a modification of the apparatus shown in FIG. 1, the thickened sludge and air are passed downward together through an enclosed forced ventilated biological filter in the tank 6.

The embodiment shown in FIG. 2 is generally similar to that shown in FIG. 1. Two aeration tanks 21 and 22 containing forced ventilation biological filters are provided, the tanks being arranged to co-operate with upper and lower treatment zones 19, 20, respectively in a treatment tank 23.

The treatment tank 23 is provided with an inlet 24 for waste and with an outlet 25 for thickened sludge, the outlet 25 being located in a sunk portion 26 of the base of the tank 23 and being connected by means of a pipe 27 to the bottom part of the aeration tank 22. A pump 28 is provided to pump thickened sludge from the treatment tank to the aeration tank 22.

A pipe 29 having an inlet cone 31 is provided to carry aerated sludge to inlet cones 32 at the top of the lower treatment zone in the treatment tank. The inlet cones 32 are located above the waste inlet 24 and above the cones 32 are located outlet cones 33 which feed into a pipe 34 connected to the bottom part of the aeration tank 21. A pump 35 is provided to pump sludge from the bottom of the upper treatment zone 19 in the treatment tank to the aeration tank 21.

A pipe 36 having a cone 37 is provided to carry aerated sludge from the aeration tank 21 to inlet cones 38 at the top of the upper treatment zone 19 in the treatment tank, the cones 38 being located above the cones 33.

Outlet cones 41 connected to an outlet pipe 42 are provided in the treatment tank to carry away clarified liquid. The outlet cones 41 are disposed in a clarified liquid zone remote from the interface between the clarified liquid and the body of sludge and remote from the inlet cones 38 which are located in the body of sludge.

The operation of this apparatus is similar to the operation of the apparatus shown in FIG. 1 except that the two treatment zones 19 and 20 are established in the treatment tank. Aerated sludge flows downward in both treatment zones.

Waste is fed into the treatment tank through the inlet 24 and clarified liquid is removed along the outlet pipe 42. The flow rates are adjusted so that the interface between the sludge and the clarified liquid is remote from the cones 41 connected to the outlet pipe 42.

Excess sludge can be removed along the pipe 43 connected to the cone 31 in the aeration tank 22. To control the removal of excess sludge a valve 40 is provided in the pipe 43.

Aeration is effected in the tanks 21 and 22 by means of aerators 44 and as in the case of the embodiment shown in FIG. 1, the sludge and air may be forced downward together through biological filters in the aeration tanks.

The levels of matter in the aeration tanks 19 and 20 are maintained above the level of matter in the treatment tank so that the sludge is supplied to the treatment tank from the aeration tanks by gravity feed.

I claim:

1. Apparatus for the treatment of organically polluted waste comprising a treatment tank having an outlet for clarified liquid near its top, an outlet for thickened sludge near its base, an inlet for aerated sludge above the outlet for thickened sludge and remote from the outlet for clarified liquid, and an inlet for waste between the level of the outlet for thickened sludge and the level of the inlet for aerated sludge, and also comprising an aeration tank to which the outlet for thickened sludge and the inlet for aerated sludge are connected for the aeration of the thickened sludge and its return to the treatment tank, the aeration tank being provided with an outlet for excess sludge.

2. Apparatus for the treatment of organically polluted waste comprising a treatment tank having an outlet for clarified liquid near its top, an outlet for thickened sludge near its base, a first inlet for aerated sludge above the outlet for thickened sludge, a second outlet for sludge above the first inlet for aerated sludge and a second inlet for aerated sludge above the second outlet for sludge, the second inlet for aerated sludge being remote from the outlet for clarified liquid, the treatment tank also having an inlet for waste between the level of the outlet for thickened sludge and the level of the first inlet for aerated sludge, and the apparatus also comprising two aeration tanks, one of the tanks being connected to the outlet for thickened sludge and the first inlet for aerated sludge and the other tank being connected to the second outlet for sludge and the second inlet for aerated sludge, whereby sludge can be removed from the treatment tank at two positions, aerated and returned to the tank, and an outlet whereby excess sludge can be removed in the first aeration tank.

3. A process for the treatment of organically polluted waste comprising:
  (a) forming within a treatment tank a body of sludge charged with bacteria together with a superposed body of clarified liquid,
  (b) introducing organically polluted waste into the body of sludge at a level above the bottom of said body of sludge and below the bottom of said body of clarified liquid so that the solid constituents of the waste are retained in said body of sludge and the liquid constituents flow upwardly therethrough into the body of clarified liquid,
  (c) removing liquid from said body of clarified liquid at a level above the bottom thereof,
  (d) removing thickened sludge from the bottom of the body of sludge,
  (e) aerating the thickened sludge removed,
  (f) returning at least a portion of the resulting aerated thickened sludge to said body of sludge at a level above said level of waste introduction and below the bottom of said body of clarified liquid, the direction of flow of said returning aerated thickened sludge being downward within said body of sludge, and
  (g) removing and disposing of a portion of thickened sludge.

4. A process for the treatment of organically polluted waste comprising:
  (a) forming within a treatment tank a body of sludge charged with bacteria together with a superposed body of clarified liquid,
  (b) introducing organically polluted waste into the body of sludge at a level above the bottom of said body of sludge and below the bottom of said body of clarified liquid so that the solid constituents of the waste are retained in said body of sludge and the liquid constitutents flow upwardly therethrough into the body of clarified liquid,
  (c) removing liquid from said body of clarified liquid at a level above the bottom thereof,
  (d) removing thickened sludge from the bottom of the body of sludge,
  (e) aerating the thickened sludge removed,
  (f) returning a part of the resulting aerated thickened sludge to said body of sludge at a first sludge inlet level above said level of waste introduction and below the bottom of said body of clarified liquid, the direction of flow of said returning aerated thickened sludge being downward within said body of sludge,
  (g) removing a part of said resulting aerated thickened sludge of step (e) and disposing of same,
  (h) removing sludge from said body of sludge at a second sludge outlet level below said bottom of clarified liquid and above said first sludge inlet level,
  (i) aerating the sludge removed in step (h), and
  (j) returning the aerated sludge of step (i) to said body of sludge at a second sludge inlet level above said second sludge outlet level and below said bottom of carified liquid,
  (k) the material moving in said steps (d), (e) and (f) constituting one recycle sludge stream and the material moving in steps (h), (i) and (j) constituting a second recycle sludge stream.

5. A process as claimed in claim 3 wherein there is maintained a mass of thickened sludge in which said aeration step (e) is preformed by passing air upwardly through said mass.

6. A process as claimed in claim 5 wherein said portion of thickened sludge of step (g) is removed from said mass of thickened sludge.

References Cited in the file of this patent
UNITED STATES PATENTS
2,723,231    Logan et al. _____ Nov. 8, 1955